United States Patent
Kato et al.

(10) Patent No.: US 7,604,037 B2
(45) Date of Patent: Oct. 20, 2009

(54) MOLDING APPARATUS AND DIE CHANGING APPARATUS FOR EXCLUSIVE DIE

(75) Inventors: Tsukasa Kato, Toyota (JP); Hidenori Uebayashi, Toyota (JP); Yoshiki Matsuura, Toyota (JP); Hiroaki Furuya, Ube (JP); Kaoru Fujii, Ube (JP)

(73) Assignees: Toyota Jidosha Kabushiki Kaisha, Toyota (JP); Ube Kosan Kikai Kabushiki Kaisha, Ube (JP)

( * ) Notice: Subject to any disclaimer, the term of this patent is extended or adjusted under 35 U.S.C. 154(b) by 0 days.

(21) Appl. No.: 11/984,802

(22) Filed: Nov. 21, 2007

(65) Prior Publication Data
US 2008/0105397 A1 May 8, 2008

Related U.S. Application Data

(60) Division of application No. 11/390,073, filed on Mar. 28, 2006, which is a continuation of application No. PCT/JP2004/014897, filed on Oct. 1, 2004.

(30) Foreign Application Priority Data
Oct. 1, 2003 (JP) .............................. 2003-343351

(51) Int. Cl.
*B22D 33/04* (2006.01)
*B29C 45/66* (2006.01)

(52) U.S. Cl. .................. 164/137; 164/339; 164/342; 425/186; 425/190; 425/192 R (58) Field of Classification Search ............... 425/190, 425/589, 590, 595, 450.1, 451, 451.2, 451.3, 425/451.9, 225, 451.7, 169, 193, DIG. 221, 425/DIG. 223, 186, 192 R, 195; 164/137, 164/339, 342; 29/428
See application file for complete search history.

(56) References Cited

U.S. PATENT DOCUMENTS

| 2,984,124 | A | * | 5/1961 | Keyser ....................... 425/186 |
| 4,805,285 | A | * | 2/1989 | Reyes ......................... 29/407.1 |
| 5,284,432 | A | * | 2/1994 | Wurzer ........................ 425/195 |
| 5,302,105 | A | * | 4/1994 | Bertleff ....................... 425/190 |
| 5,352,394 | A | * | 10/1994 | Fujita et al. ................. 264/40.5 |
| 5,417,913 | A | * | 5/1995 | Arend ....................... 264/328.1 |
| 5,674,541 | A | | 10/1997 | Svoboda |
| 6,613,262 | B1 | * | 9/2003 | Arend ......................... 264/255 |

(Continued)

FOREIGN PATENT DOCUMENTS

DE      3711080 A1 * 10/1988

(Continued)

*Primary Examiner*—Philip C Tucker
*Assistant Examiner*—Dimple N Bodawala
(74) *Attorney, Agent, or Firm*—Oliff & Berridge, PLC (57) ABSTRACT

Die opening-closing means includes a servo motor and a movement conversion mechanism and is disposed between a support plate and a base stand. A movable plate is mounted on the support plate that is disposed on the base stand via a linear movement guide. In a forging cycle, die opening and closing is performed by activation of the die opening-closing means and tie bar fixing means at a rear surface side of the movable plate, and clamping force is obtained using a die clamping cylinder provided in the movable plate. When it is necessary to change over exclusive dies and change over is performed by: extending tie bar removal cylinders provided in a frame behind the movable plate so as to remove tie bars from a fixed plate; and moving a movable rail of internal rails to an open position and moving the change over carriage in along the internal rails from the outside.

8 Claims, 10 Drawing Sheets

U.S. PATENT DOCUMENTS

| | | | |
|---|---|---|---|
| 6,883,583 B2 * | 4/2005 | Matsuura et al. | 164/342 |
| 6,893,246 B2 * | 5/2005 | Teng et al. | 425/214 |
| 6,955,210 B2 * | 10/2005 | Matsuura et al. | 164/339 |
| 2003/0020194 A1 * | 1/2003 | Di Dio et al. | 264/40.5 |
| 2003/0138513 A1 * | 7/2003 | Matsuura et al. | 425/186 |
| 2003/0150586 A1 | 8/2003 | Matsuura et al. | |
| 2003/0190386 A1 | 10/2003 | Fujita et al. | |
| 2004/0178536 A1 | 9/2004 | Kato et al. | |

FOREIGN PATENT DOCUMENTS

| | | |
|---|---|---|
| DE | 40 39 325 A1 | 7/1991 |
| DE | 197 46 457 A1 | 4/1999 |
| EP | 1 356 914 A1 | 10/2003 |
| JP | 56131056 A * | 10/1981 |
| JP | 63168321 A * | 7/1988 |
| JP | 10337623 A * | 12/1998 |
| WO | WO00/23247 * | 4/2000 |
| WO | WO 02/062556 A1 | 8/2002 |

* cited by examiner

MOLDING APPARATUS AND DIE CHANGING APPARATUS FOR EXCLUSIVE DIE

This is a Division of application Ser. No. 11/390,073 filed Mar. 28, 2006. The disclosure of the prior application is hereby incorporated by reference herein in its entirety.

FIELD OF THE INVENTION

The present invention relates to a molding apparatus used in die casting, injection molding and the like, and a change over method that is implemented for an exclusive die of the molding apparatus.

BACKGROUND OF THE INVENTION

Conventional molding apparatuses used in die casting, injection molding and the like generally include a fixed plate that supports a fixed die, a movable plate that supports a movable die, and a support plate. A plurality of tie bars (normally, four) are inserted through and extend from the movable plate and have respective end portions that are fixed to the fixed plate and the support plate. A die clamping mechanism is disposed between the support plate and the movable plate. Accordingly, a structure is provided in which closing and clamping of the die are performed by moving the movable plate along the tie bars toward the fixed plate side. With the type of molding apparatus, as the die clamping mechanism in large-sized molding apparatuses, a toggle type die clamping mechanism is often used since it enables a large clamping force to be generated in resistance to the substantial internal die pressure.

However, recently, it is becoming common for production lines to carry out small batch multiple product production, and thus the cycle of die replacement is becoming shorter. Further, as a result of tougher demands for product accuracy and productivity, there has been a tendency for injection pressure and injection speed to be raised more and more. This has been accompanied by an unavoidable shortening in die life, and as a result there has been an increase in the frequency of die replacement. However, conventionally, with general-use die casting machines or injection molding apparatus, a plurality of tie bars are disposed around the fixed die and the movable die as previously described. Accordingly, a problem has arisen in that the tie bars form an obstruction to the die replacement operation (change over). Moreover, with the toggle type die clamping mechanism, in addition to the fact that the components (links etc.) configuring the toggle mechanism are complicated and large sized, it is necessary to provide a die clamping cylinder with a long stroke. Thus, a problem occurs in that an increase in installation space is unavoidable.

To address this, recently, various types of molding apparatus have been investigated which do not require tie bars and which allow the toggle type clamping mechanism to be disused. For example, Japanese Patent Laid-Open Publication No. Hei. 8-72113 discloses a molding apparatus in which: a die opening-closing cylinder is disposed between a fixed die plate (fixed plate) and a movable die plate (movable plate) and moves the movable plate forward and backward with respect to the fixed plate to perform opening and closing of a movable die with respect to a fixed die; connecting-fixing means (tie bar fixing means) disposed at a rear surface side of the fixed plate and the movable plate for fixing a tie bar in a removable manner to both plates; and a die clamping cylinder which is disposed in the vicinity of a tie bar insertion hole of the fixed plate or the movable plate and which generates a die clamping force that pushes the movable plate toward the fixed plate side using the tie bar fixing means and the tie bar. Moreover, Japanese Patent Laid-Open Publication No. Hei. 8-117959 discloses a molding apparatus in which, in a structure that is the same as that described above, a dedicated tie bar removal cylinder is provided separately from a die opening-closing cylinder.

With these molding apparatus, if fixing of the tie bar with respect to the fixed plate side is released, and the die opening-closing cylinder or the tie bar removal cylinder is activated and extended, the tie bar is removed from the fixed plate. Thus, it is possible to remove the tie bar from the fixed plate and perform change over without the tie bar causing interference. In addition, die clamping is performed using the die clamping cylinder, and thus these molding apparatus have the advantage that the complicated toggle type die clamping mechanism can be disused.

However, according to the molding apparatus disclosed in Japanese Patent Laid-Open Publication No. Hei. 8-72113 and Japanese Patent Laid-Open Publication No. Hei. 8-117959, in either structure, the die opening-closing cylinder is disposed transversely between the fixed plate and the movable plate. Thus, a problem occurs in that the space that can be effectively used for change over is inadequate.

DISCLOSURE OF THE INVENTION

The present invention has been conceived of in light of the aforementioned known problems and seeks to address them by providing a molding apparatus which contributes to improvement in the ease of performing the change over operation by using a structure which maintains a tie bar removal function but in which a die opening-closing cylinder is not provided between a fixed plate and a movable plate. The present invention also provides a die changing apparatus for an exclusive die that is utilized with the molding apparatus.

In order to solve the above described problem, a molding apparatus according to the present invention includes: a fixed plate supporting a fixed die; a movable plate supporting a movable die; a plurality of tie bars inserted through and extending from the fixed plate and the movable plate; die opening-closing means that moves the movable plate forward and backward with respect to the fixed plate, thus opening and closing the movable die with respect to the fixed die; first tie bar fixing means that removably fixes one end portion of each of the tie bars to the fixed plate; second tie bar fixing means that removably fixes an other end of each of the tie bars to the movable plate when in a closed die position; a die clamping cylinder which is provided near to tie bar insertion holes of the fixed plate or the movable plate and which generates a clamping force that pushes the movable plate toward the fixed plate side using the first or the second tie bar fixing means and the tie bars; and a tie bar removal cylinder that moves each of the tie bars in a removal direction from the fixed plate, wherein the die opening-closing means includes a motor and a movement conversion mechanism that converts rotation of the motor to linear movement that is transmitted to a support plate on which the movable plate is mounted, the support plate being disposed on a base stand via a linear movement guide, and the die opening-closing means being disposed between the support plate and the base stand.

In the molding apparatus with the above described configuration, the movable plate is mounted on the support plate that moves via the linear movement guide. Accordingly, it is possible to smoothly move the movable plate forward and backward using the die opening-closing means including the motor and the movement conversion mechanism. Further, the die opening-closing means can be disposed in a compact manner between the support plate and the base stand and thus does not hinder the performance of change over.

In the die opening-closing means of the present molding apparatus, the motor may be a servo motor and the movement conversion mechanism may be a ball-screw mechanism or a rack-and-pinion mechanism. In this case, both position control and speed control of the movable plate can be improved significantly.

Moreover, it is preferable that the movable plate is mounted such that it can "float" on the support plate. With this configuration, even if a large moment is applied to the movable plate during clamping, the movable plate floats. Accordingly, excessive load is not applied to the linear movement guide.

Further, the above tie bar removal cylinder may be disposed in the movable plate, or may be disposed on a frame that is positioned behind the movable plate. In addition, the tie bar removal cylinder may be a double acting cylinder that can telescopically extend and retract.

In the present molding apparatus, the fixed die and the movable die may each include a general-use die of the same type and an exclusive die that forms a cavity. The exclusive die may be removably coupled to the general use die. When the fixed die and the movable die are configured in this manner, it is only necessary to replace the exclusive dies and thus change over can be performed more simply.

The present molding apparatus may be configured with a pair of internal rails which guide movement of a change over carriage for changing over the exclusive dies and which are positioned below the tie bars on a lower side and between the fixed plate and the movable plate. Further the pair of internal rails may be provided to extend in a direction that intersects with the tie bars and may be configured as, on one side, a fixed rail that is fixedly disposed at a front surface of the fixed plate and, on an other side, a movable rail that is disposed such that it can be moved into proximity to or away from the fixed rail. With the molding apparatus configured in this manner, change over can be performed quickly by using the pair of internal rails to guide the movement of the change over carriage. Moreover, the movable rail may be placed in a closed state in proximity to the fixed rail during the molding cycle so as not to cause a hindrance in die closing and opening.

In this case, it is preferable that the fixed rail and the movable rail are disposed in frames with a U-shaped cross section. The two frames are configured such that when the movable rail is moved into proximity to the fixed rail, facing open ends of the frames abut with each other in a closed manner. By adopting this configuration, the fixed rail and the movable rail are placed in a closed away state within the frame during the molding cycle, and thus corrosion of the rails cannot be caused by contact with mold releasing agent, external coolant, or the like, and foreign matter is prevented from adhering on the rails.

Moreover, when the above frames are provided, a transmission conductor or a rack may be disposed within the frame on which the fixed rail is provided. Further, a collector brush that rubs against the transmission conductor or a pinion that meshes with the rack and a motor that rotates the pinion may be provided in the change over carriage. With this configuration, it is possible for the change over carriage to be self driven in a safe and smooth manner.

In order to address the above described problem, a change over method according to the present invention is a change over method for performing change over of the exclusive die in the molding apparatus provided with the pair of internal rails that guide movement of the change over carriage. The change over method is characterized in that, after the movable plate is moved back to an open die position by the die opening-closing means, fixing of the fixed plate side to the tie bars on the lower side is released while the tie bar removal cylinders are activated so as to remove the tie bars on the lower side from the fixed plate, and then the exclusive die is replaced by moving the change over carriage using the internal rails as a guide.

With this change over method, relay rails may be provided that connect between the internal rails of two molding apparatus that are arranged in a row as paired machines. The change over carriage may be moved from the relay rails to the internal rails and be commonly used for change over of the exclusive dies of both of the molding apparatus.

According to the molding apparatus of the present invention, a structure is provided that can maintain a tie bar removal function without providing a die opening-closing cylinder between the fixed plate and the movable plate. Accordingly, when performing change over, a large space can be opened up between the fixed plate and the movable plate, thus enabling a remarkable improvement in not only the ease of performing change over but also the degree of freedom of installing change over means.

Further, with the change over method for the exclusive die according to the present invention, change over can be performed efficiently by using the internal rails to guide movement of the change over carriage.

BEST MODE FOR CARRYING OUT THE INVENTION

Hereinafter, the best mode of embodying the present invention will be described with reference to the accompanying drawings.

Figure 1:
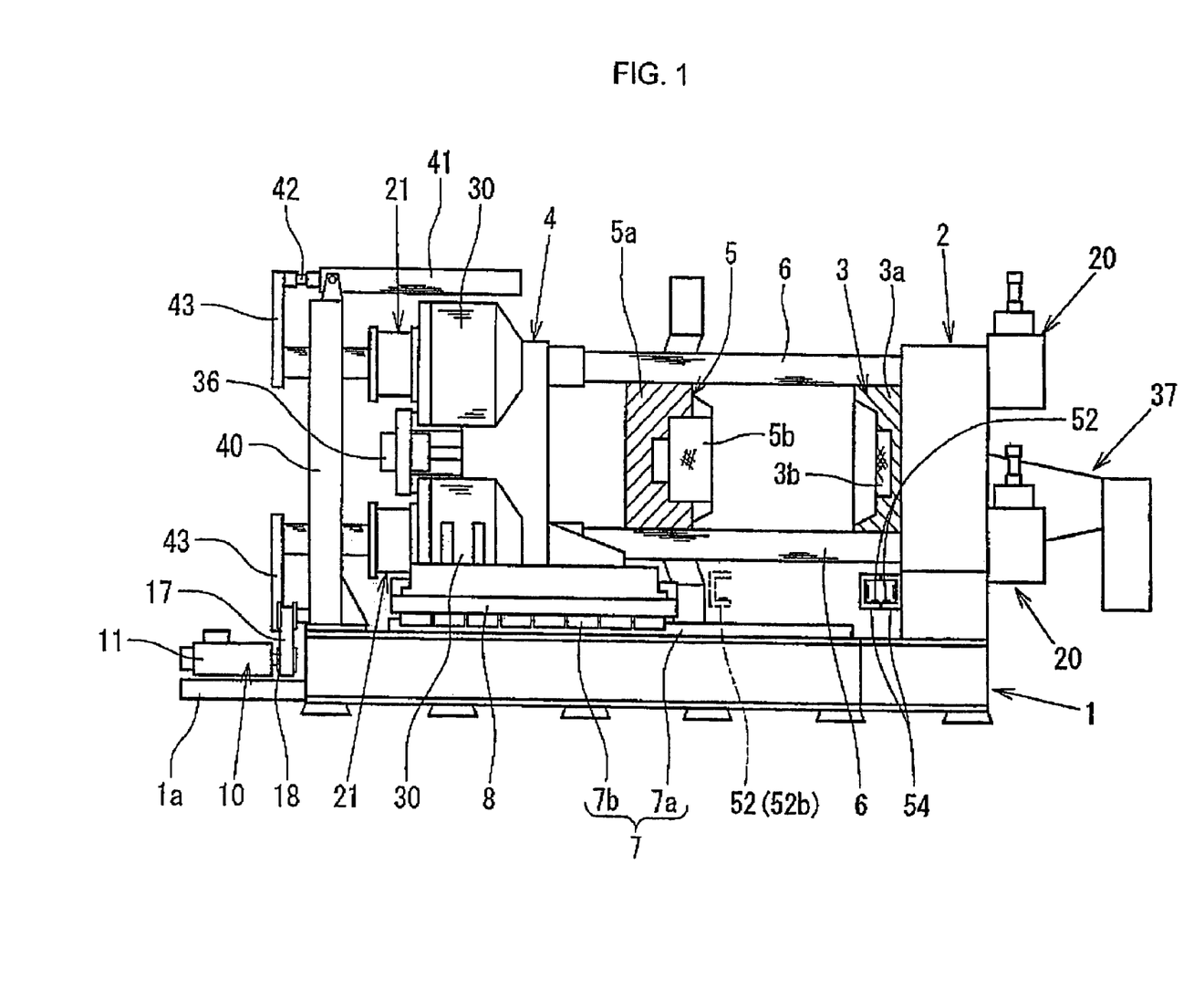
FIG. 1 is a side view of a partial cross section of an overall structure of a molding apparatus that is one embodiment of the present invention.
Figure 2:
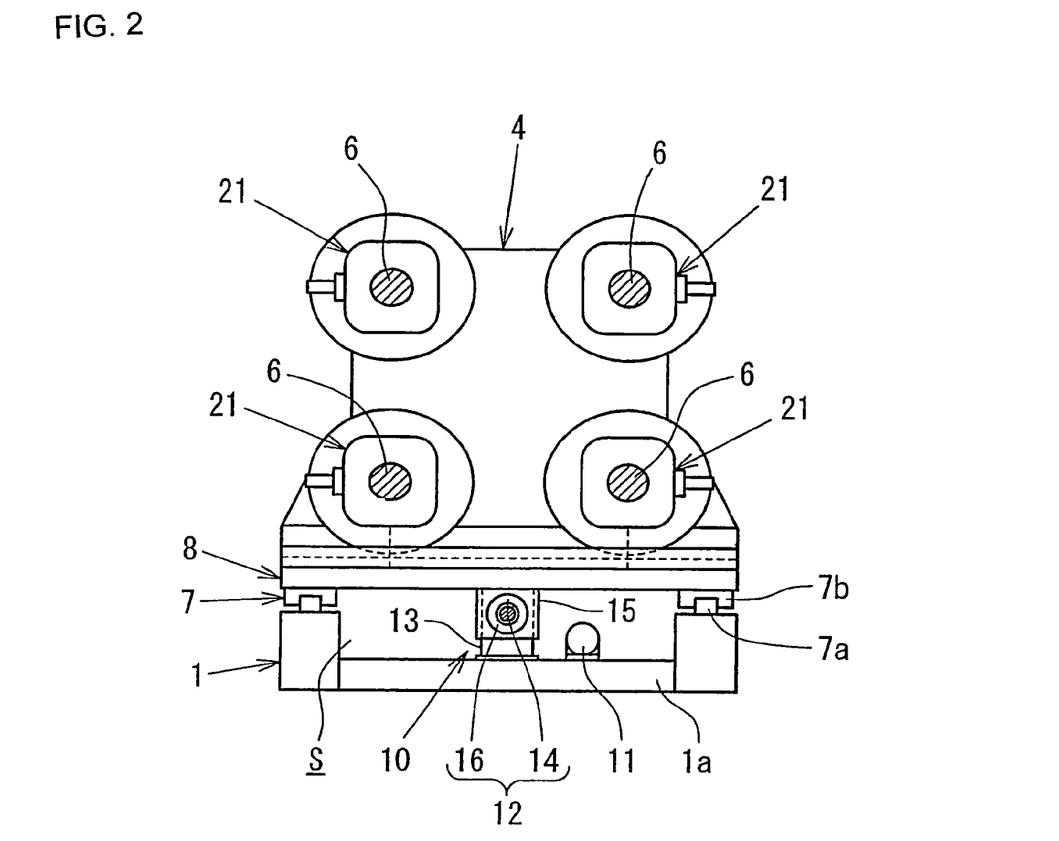
FIG. 2 is a front view showing the partial cross section of the overall structure of the present molding apparatus.
Figure 3:
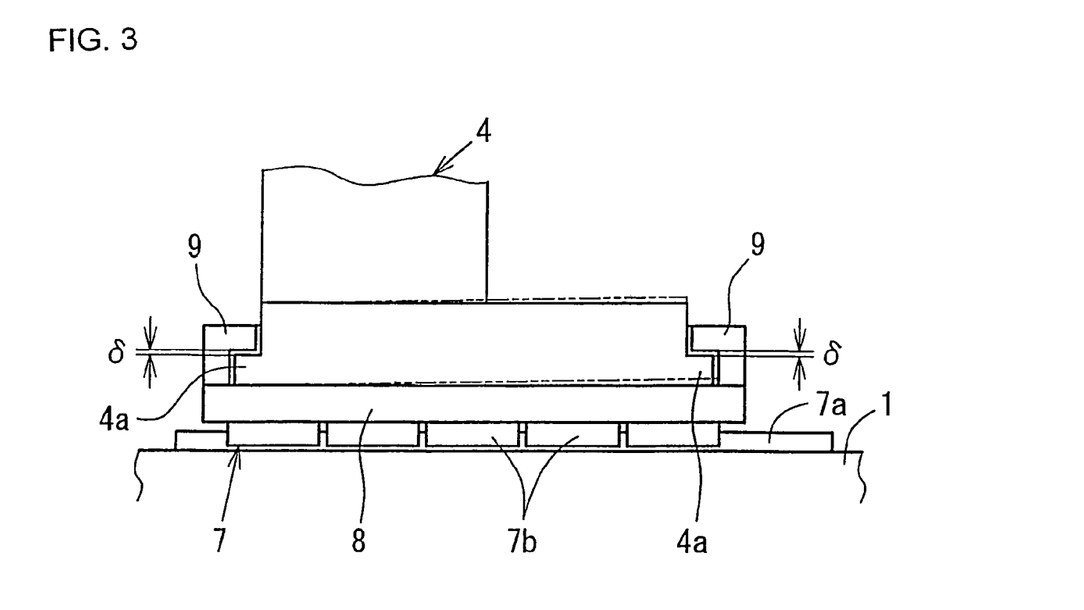
FIG. 3 is a side view showing a movable plate and a support structure thereof that construct the present molding apparatus.

FIGS. 1 to 3 show an overall structure of a molding apparatus for die casting that is one embodiment of the present invention. The figures show a base stand 1; a fixed plate 2 that supports a fixed die 3; a movable plate 4 that supports a movable die 5; and four tie bars 6 that extend from a rear surface side of the fixed plate 2 through the movable plate 4 to the rear side thereof. The fixed plate 2 is fixed to one edge of the base stand 1, and, on the other hand, the movable plate 4 is mounted on a support plate 8 that is disposed on the base stand 1 via a linear movement guide 7. The movable plate 4 has a flange portion 4a at front-rear edge portion of a base portion thereof that is accommodated at an inner side of an L-shaped retaining member 9 provided at a front-rear edge portion of the support plate 8. Accordingly, the movable plate 4 has its position fixed with respect to the support plate 8. In addition, a slight gap δ (FIG. 3) is provided between the flange portion 4a of the movable plate 4 and the retaining member 9 of the support plate 8. The movable plate 4 is able to move with respect to the support plate 8 within the area of this gap δ.

The linear movement guide 7 is configured from: a left-right pair of guide rails 7a that are disposed on the base stand 1 so as to extend parallel to the tie bars 6; and a plurality of bearings 7b which are fixed to a lower surface of the support plate 8 and which are connected to the guide rails 7a via balls, not shown. The movable plate 4 can be moved forward and backward with respect to the fixed plate 2 in an integrated manner with the support plate 8 that moves using the linear movement guide 7.

The base stand 1, as is clearly apparent from FIG. 2, has an overall body with a U-shaped cross section. A fairly large space S is maintained between a lower plate 1a of the base stand 1 and the support plate 8. In the present embodiment, this space S is used to dispose, between the base stand 1 and the support plate 8, die opening-closing means 10 that moves the support plate 8 using the linear movement guide 7, namely, moves the movable plate 4 forward and backward.

The die opening-closing means 10 is configured from a motor (servo motor) 11 and a ball screw mechanism (movement conversion mechanism) 12 that converts rotation of the motor 11 to linear movement and transmits it to the support plate 8. The ball screw mechanism 12 is configured from: a screw shaft 14 which is provided on the lower plate 1a of the base stand 1 and which has both end portions rotatably supported by a pair of front-back support pillars 13 (one side is not shown) that are provided at a distance of separation in a length direction of the tie bars 6; and a nut 16 which is non-rotatably fitted to a bracket 15 that is provided so as to hang down from the lower surface of the support plate 8 and which is screwed onto the screw shaft 14 using balls, not shown. On the other hand, the servo motor 11 is disposed on an extension portion of the lower plate 1a of the base stand 1. An output shaft of the servo motor 11 and the screw shaft 14 are operationally coupled via a belt (timing belt) 17 and a pulley (timing pulley) 18, as shown in FIG. 1.

More specifically, the movable plate 4 is moved forward and backward with respect to the fixed plate 2 in accordance with operation of the motor-driven die opening-closing means 10. Along with this forward and backward movement, the movable die 5 is moved with respect to the fixed die 3 to perform closing and opening. At this time, both speed control and position control can be favorably performed since the die opening-closing means 10 is configured from the servo motor 11 and the ball screw mechanism 12, and thus it is possible to accurately position the movable plate 4 at a closed die position and an open die position. Note that, it goes without saying that the ball screw mechanism 12 may be replaced with another movement conversion mechanism like, for example, a rack-and-pinion mechanism.

First tie bar fixing means 20 is disposed at a rear surface of the fixed plate 2 and removably fixes one end portion of each tie bar 6 to the fixed plate 2. On the other hand, second tie bar fixing means 21 is disposed at a rear surface of the movable plate 4 and removably fixes a central portion of each tie bar 6 to the movable plate 4.

Figure 4:
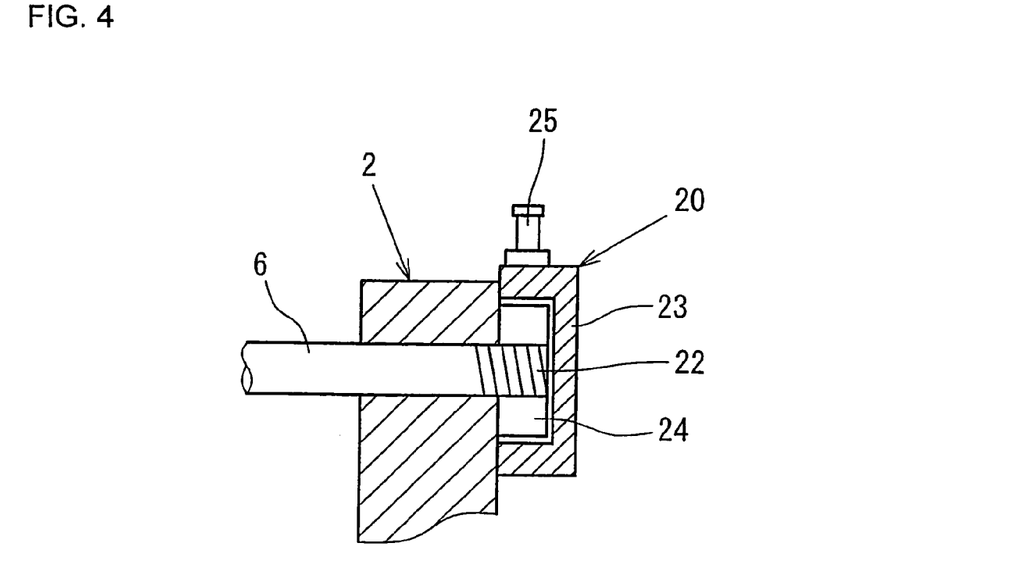
FIG. 4 is a cross section view of a structure of tie bar fixing means of a fixed plate side that constructs the present molding apparatus.

As can be seen from FIG. 4, the first tie bar fixing means 20 at the fixed plate 2 side is configured from: a screw portion 22 formed in an external periphery surface of the tie bar 6; a split nut 24 disposed within a box 23 which is fixed to the rear surface of the fixed plate 2 and which has a closed-box shape; and a drive mechanism (not shown) that uses a cylinder 25 as a drive power source for performing loosening and tightening movements of the split nut 24. When the first tie bar fixing means 20 performs the tightening movement of the split nut 24 by operation of the cylinder 25, the split nut 24 is screwed on to the screw portion 22, whereby the tie bar 6 is fixed with respect to one end portion of the fixed plate 2.

Figure 5:
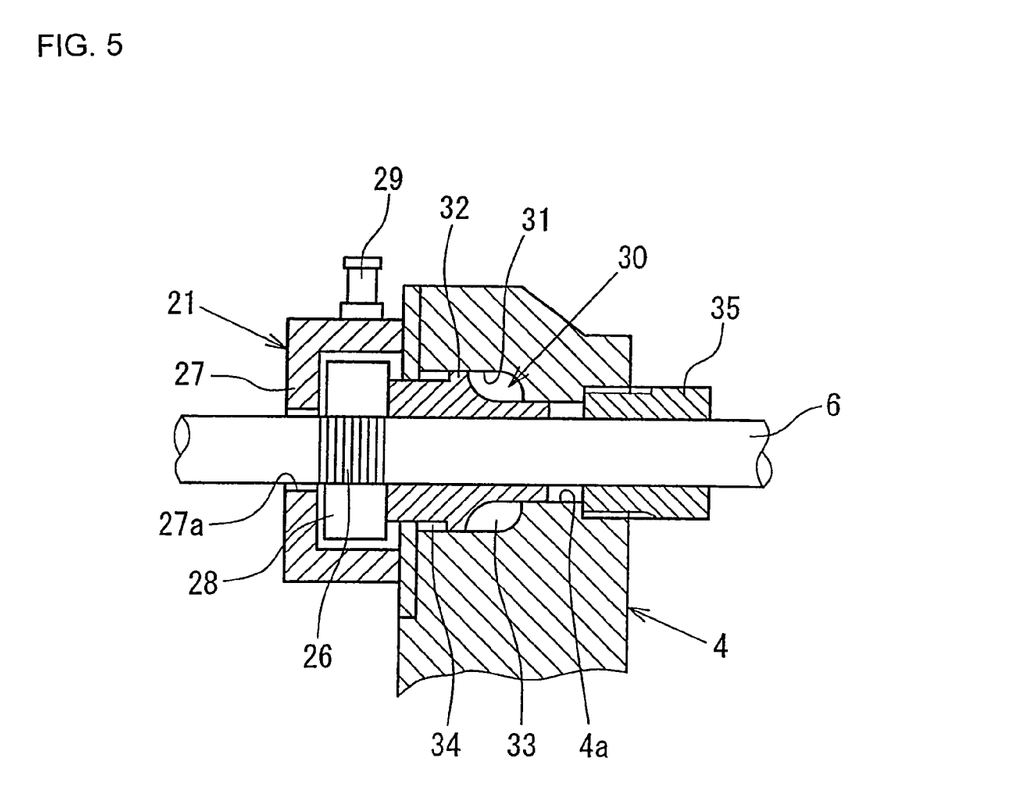
FIG. 5 is a cross section view of a structure of tie bar fixing means of a movable plate side that constructs the present molding apparatus.

The second tie bar fixing means 21 at the movable plate 4 side is configured from, as shown in FIG. 5, a plurality of grooves 26 formed in the external periphery surface of the tie bar 6; a split nut 28 disposed within a box 27 which is fixed to a rear surface of the movable plate 4; and a drive mechanism that uses a cylinder 29 as a drive power source for performing loosening and tightening movements of the split nut 28. The box 27 of the second tie bar fixing means 21 has a through hole 27a in a lower surface thereof. The tie bar 6 passes through the through hole 27a and extends therefrom. The structure of the tie bar 6 is such that, when the movable plate 4 has been moved forward to the closed die position, the plurality of grooves 26 are positioned with the box 27. In this state, when tightening movement of the split nut 28 is performed by operation of the cylinder 29, the split nut 28 is meshed with the plurality of grooves 26 of the tie bar 6, whereby the tie bar 6 is fixed with respect to the movable plate 4. In other words, as a result of fixing the tie bar 6 with respect to the movable plate 4, a closed die state is maintained in which the movable die 5 is aligned with the fixed die 3.

A die clamping cylinder 30 is provided around each tie bar through hole 4a of the movable plate 4, as shown in FIG. 5, in a similar manner. In this case, the die clamping cylinder 30 includes a cylinder portion 31 formed around the tie bar through hole 4a; a stepped piston 32 with a ring shape that can be slidably fitted in the cylinder portion 31. The tie bar 6 is inserted through an internal portion of the piston 32. The piston 32 delineates two fluid chambers 33 and 34 in the length direction of the tie bar 6. Hydraulic fluid is supplied to and discharged from the two fluid chambers 33 and 34 using a hydraulic circuit, not shown.

The piston 32 in the die clamping cylinder 30 has an end portion that extends toward the second tie bar fixing means 21 side. An end surface of the piston 32 is positioned to face the split nut 28. The split nut 28 in the second tie bar fixing means 21 is configured such that it meshes with the plurality of grooves of the tie bar 6 when, in the above described manner, tightening movement is performed in the closed die state. In this meshed state, hydraulic fluid is supplied to the fluid chamber 33 on one side. As a result, the piston 32 is moved slightly in the left direction of FIG. 5 until it abuts with the split nut 28, where its position is fixed. Accordingly, after this, if more hydraulic fluid is supplied to the fluid chamber 33 on one side, the movable plate 4 is pushed toward the fixed plate 2 side via the split nut 28 and the tie bar 6. Thus, a substantial clamping force is applied to a mating portion of the closed movable die 5 and the fixed die 3. Note that, a hollow-centered guide 35 is attached to the movable plate 4 so as to position each tie bar 6 coaxially with respect to the piston 32 (FIG. 5)

Figure 12:
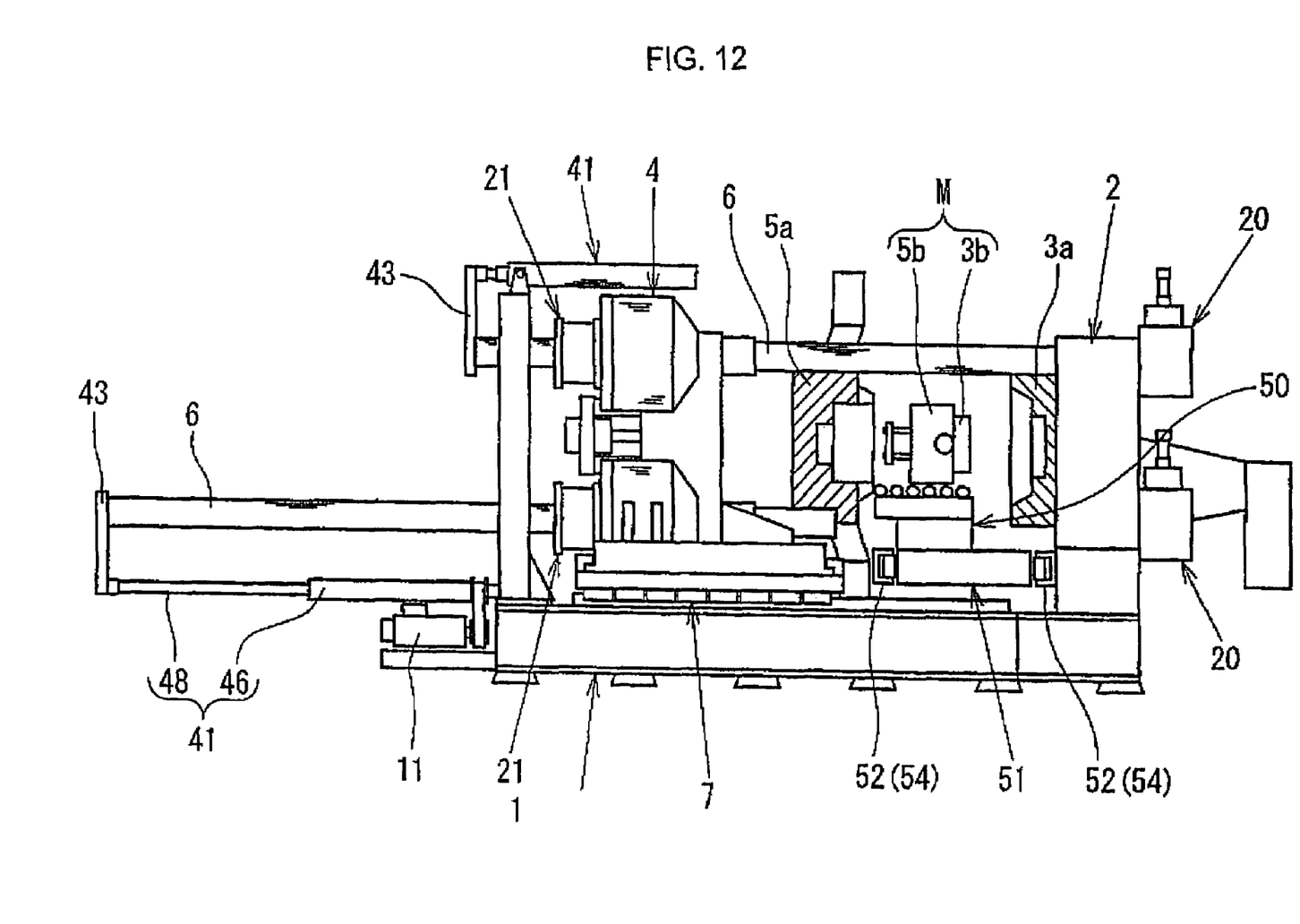
FIG. 12 is a side view showing a change over method for an exclusive die that is performed for the present molding apparatus.

In the present embodiment, the fixed die 3 and the movable die 5 are configured from the same type of general-use dies 3a and 5a, and exclusive dies 3b and 5b that form cavities. An attachment-detachment mechanism (not shown) enables the exclusive dies 3b and 5b to be automatically attached to or detached from the general-use dies 3a and 5a. In addition, the exclusive die 3b on the fixed die 3 side and the exclusive die 5b on the movable die 5 side can be made into an integrated unit by a coupling mechanism (not shown). When change over is carried out, as shown in FIG. 12, the exclusive dies 3b and 5b form a single integrated body M, and are placed on a change over carriage 51 in a die changing apparatus 50. Note that, the attachment-detachment mechanism and the coupling mechanism are disclosed in detail in Japanese Patent Laid-open Publication No. 2003-191063, which is an application of the present applicants and others. Accordingly, here, the description is limited to that given above. Further, in FIG. 1, reference numeral 36 denotes a cylinder unit for driving an extrusion mechanism within the movable die 5. The cylinder unit 36 is an injection unit for injecting molten metal into the cavity formed between the fixed die 3 and the movable die 5. A detailed explanation of this is also omitted here.

Figure 13:
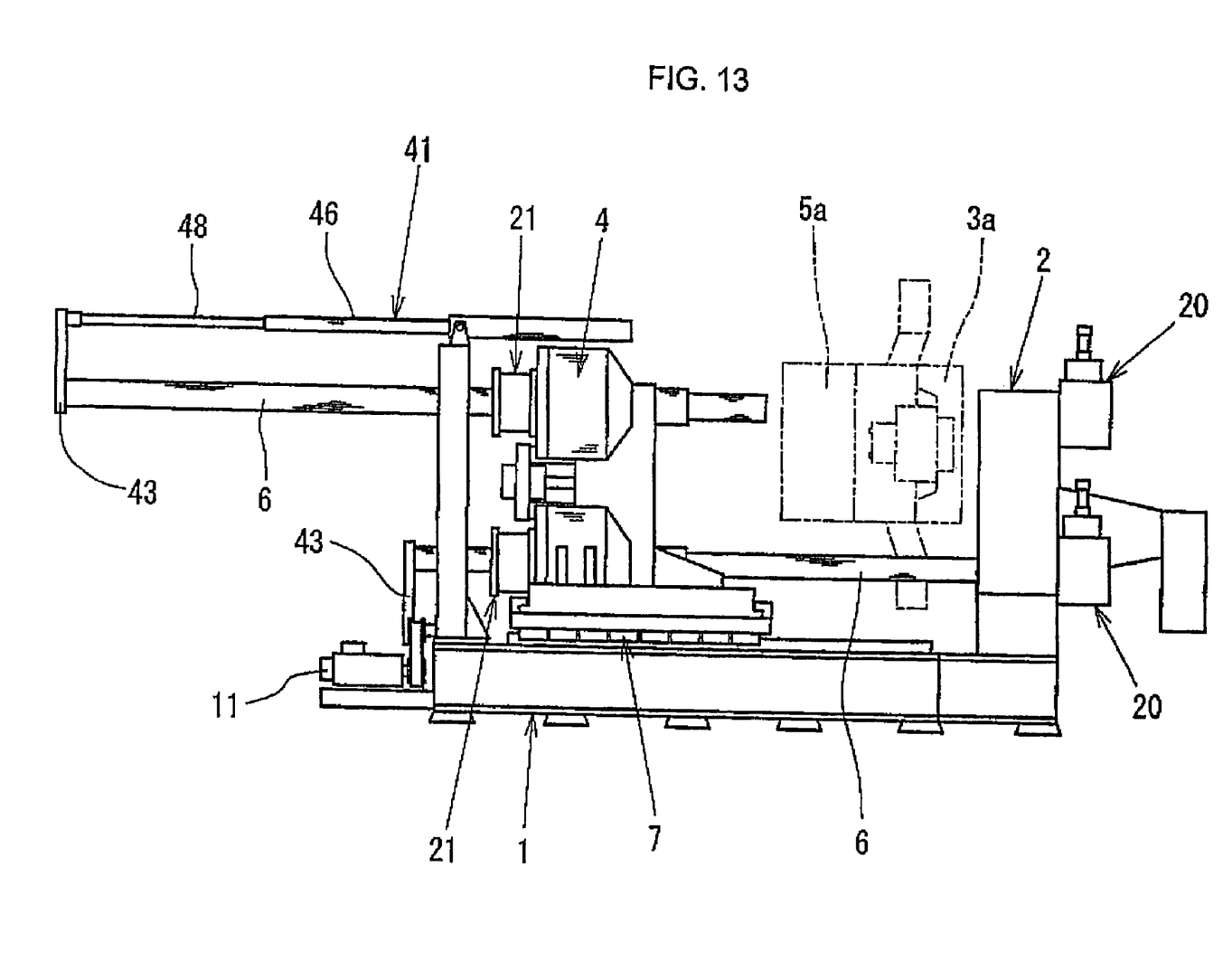
FIG. 13 is a side view showing a change over method for a general-use die that is performed for the present molding apparatus.

On the other hand, as shown in FIG. 1, a frame 40 stands upright at the other end portion of the base stand 1, which is to the rear of the movable plate 4. Four tie bar removal cylinders 41 are mounted to this frame 40 in correspondence with the four tie bars 6. Each rod 42 of each tie bar removal cylinder 41 extends in the opposite direction to the movable plate 4 side, and an other end portion of each tie bar 6 is coupled to a tip end of each rod 42 via a coupling member 43. Thus, if fixing of the first tie bar fixing means 20 with respect to the tie bars 6 is released in a state in which the movable plate 4 has its position fixed at the open die position (a state in which fixing of the second tie bar fixing means 21 of the movable plate 4 side is released), the tie bar removal cylinders 41 are activated and extend whereby the tie bars 6 are removed from the fixed plate 2, as will be described later in more detail (FIG. 12 or FIG. 13).

Figure 6:
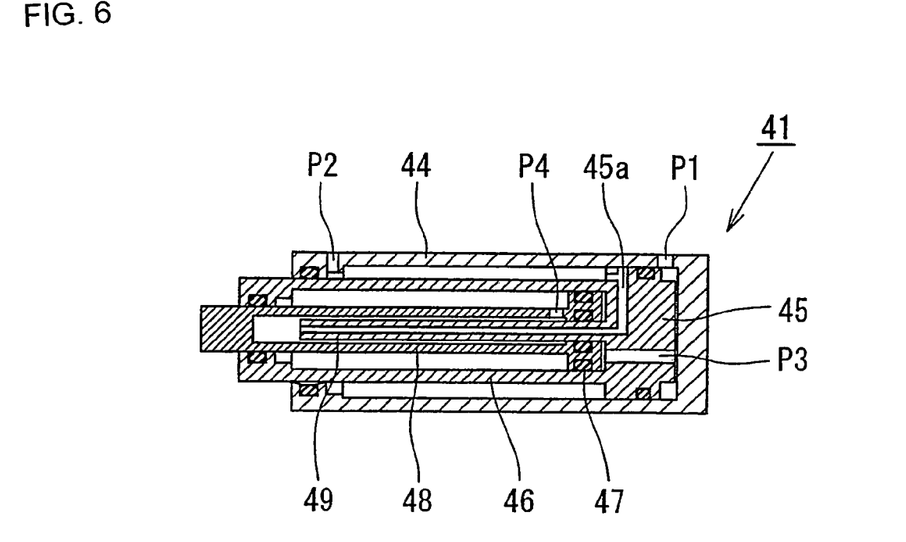
FIG. 6 is a cross section view of a structure of a tie bar removal cylinder that constructs the present molding apparatus.
Figure 7:
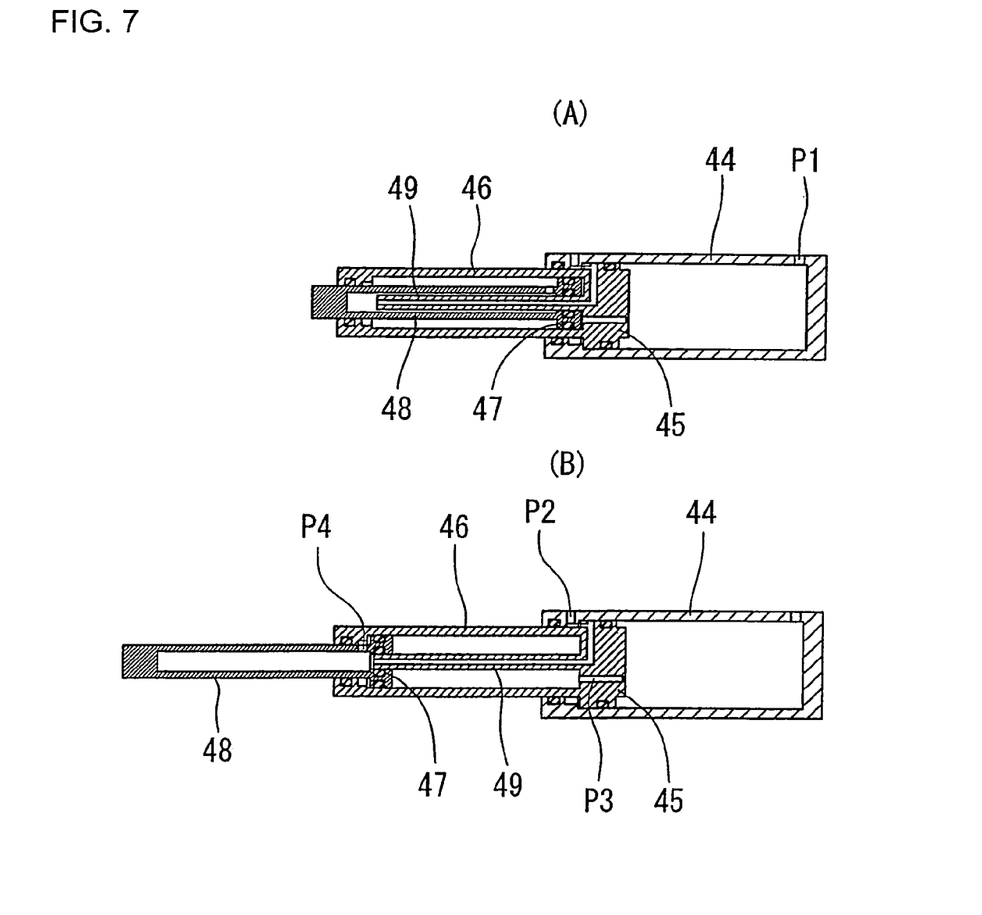
FIG. 7 is a cross section view showing an operational state of the tie bar removal cylinder shown in FIG. 6.

Note that, for the tie bar removal cylinders 41, it is favorable to use double acting cylinders that are capable of extending and retracting in a telescopic manner. FIG. 6 and FIG. 7 show an example of the structure of the tie bar removal cylinder 41 using this type of double acting cylinder. A main piston 45 is slidably housed within a cylinder main body 44. A main hollow rod 46 that passes through one end of the cylinder main body 44 in a fluid tight manner has a base end that is coupled to the main piston 45. Further, an auxiliary piston 47 is slidably housed within the main hollow rod 46, and an auxiliary hollow rod 48, which passes through one end of the main hollow rod 45 in a fluid tight manner, has a base end that is coupled to the auxiliary piston 47. In addition, a hollow guide 49 that passes through the auxiliary piston 47 in a fluid tight manner and extends within the auxiliary hollow rod 48 has a base end that is coupled to the main piston 45. A hollow internal portion of the hollow guide 49 is provided so as to act as a fluid passage connecting to a rod side chamber within the cylinder main body 44 via a fluid passage 45a provided in the main piston 45.

Moreover, supply-discharge ports P1 and P2 for supplying and discharging fluid to and from the inside of the cylinder main body 44 are provided at front and rear end portions of the cylinder main body 44. A connecting port P3 that connects an opposite-rod side chamber in the cylinder main body 44 and an opposite-rod side chamber in the main hollow rod 46 is provided in the main piston 45. A connection port P4 that connects the inside of the auxiliary hollow rod 48 and a rod side chamber within the main hollow rod 46 is provided in the auxiliary hollow rod 48.

With the tie bar removal cylinders 41 configured with the above described configuration, if pressurized fluid is supplied to the opposite-rod side chamber within the cylinder main body 44 via the supply-discharge port P1 in the fully contracted state shown in FIG. 6, first, as shown in FIG. 7(A), the main piston 45 slides in the direction to the left of the figure, and the main hollow rod 46 and the auxiliary hollow rod 48 are extended in an integrated manner. After this, when the main hollow rod 46 reaches a fully extended end, as shown in (B) of the same figure, the auxiliary piston 47 slides in the direction to the left of the figure due to fluid pressure supplied via the connecting port P3. Thus, the auxiliary hollow rod 48 is extended. On the other hand, from this state, if pressurized fluid is supplied to the rod side chamber of the cylinder main body 44 via the supply-discharge port P2, first, the main piston 45 slides in the direction to the right of the figure and the main hollow rod 46 is retracted. When the main hollow rod 46 reaches a fully retracted end, the fluid pressure is supplied to the rod side chamber within the main hollow rod 46 via the fluid passage 45a provided in the main piston 45, the fluid passage formed within the hollow guide 49, and the port P4. As a result, the auxiliary hollow rod 48 is retracted and returns to the state shown in FIG. 6.

As will be apparent, the configuration of the tie bar removal cylinders 41 is such that a long stroke is achieved by extending and retracting the main hollow rod 46 and the auxiliary hollow rod 48 in a telescopic manner. Accordingly, it is possible to remove the tie bars 6 to a substantial degree from the fixed plate 2. Note that, in FIG. 1, for the sake of explanatory ease, the main hollow rod 46 and the auxiliary hollow rod 48 are shown in a simplified manner as being included in the rods 42.

Figure 8:
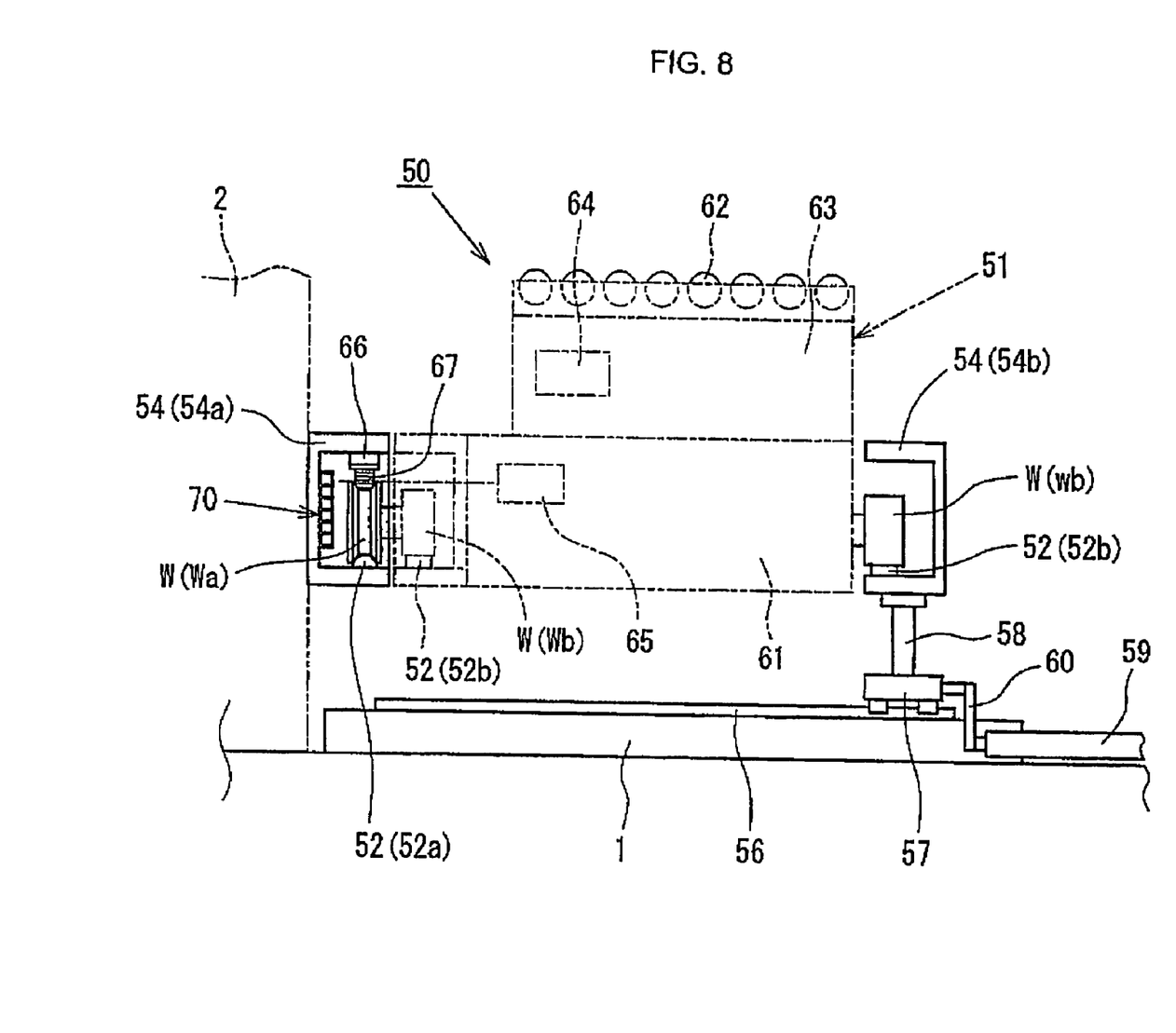
FIG. 8 is a schematic front view showing a die changing apparatus that constructs the present molding apparatus.
Figure 9:
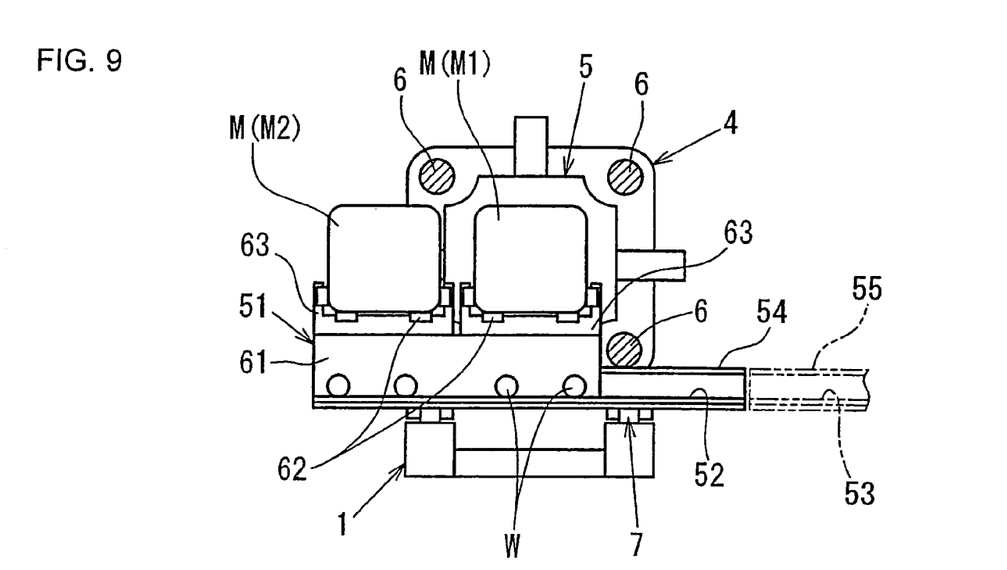
FIG. 9 is a schematic side view showing the die changing apparatus that constructs the present molding apparatus.

The die changing apparatus 50, as is apparent from FIG. 8 and FIG. 9, is provided with a pair of internal rails 52 that guide movement of the change over carriage 51, and a pair of external rails 53 (one side is not shown). The internal rails 52 are positioned below the tie bars 6 on the lower side between the fixed plate 2 and the movable plate 4 and are disposed to extend in a direction that intersects with the tie bars 6.

The pair of internal rails 52 are provided within a frame 54 that has a frame 54a and a frame 54b that have U-shaped cross sections. The frame 54 has the frame 52a on one side on which one side of the rails 52a is provided, and is attached to a front surface of the fixed plate 2 such that its position is fixed. Accordingly, the one side rail 52a is a fixed rail. In contrast to this, the other side of the frame 54b, on which an other rail 52b is disposed, is positioned such that it can be moved into proximity to or away from the one side frame 54a. Thus, the other rail 52b is a movable rail. Note that, the fixed rail (the one side rail) 52a has a V-shape and the movable rail (the other side rail) 52b is flat. Wheels W of the change over carriage 51 are, in alignment with the rail shapes, a V-shaped wheel Wa on one side, and a flat wheel Wb on the other side.

On the other hand, the pair of external rails 53 are provided, like the internal rails 52, on the inside of a U-shaped frame 55. Unlike the frame 54 of the internal rails 52 side, the U-shaped frame 55 is fixedly provided. Accordingly, the pair of external rails 53 have a fixed width.

Note that, the frame 54b, on which the movable rail 52b is provided, is supported via a support pillar 58 on a slider 57 that moves along a left-right pair of guide rails 56 that are disposed to extend in the direction of the tie bars 6 on the base stand 1. Further, the space S (FIG. 2) between the base stand 1 and the support plate 8 is utilized for positioning a rail opening-closing cylinder 59. An end of an output shaft of the rail opening-closing cylinder 59 is coupled to the slider 57 by a coupling member 60. More specifically, the structure is such that the movable rail 52b can be positioned in an open position indicated by the solid line in FIG. 8 or a closed position indicated by the dashed line in the same figure in accordance with extension and retraction of the rail opening-closing cylinder 59. At the closed position, open ends of the pair of frames 54a and 54b are aligned with each other and thereby closed. In addition, in a state in which the movable rail 52b is positioned at the open position, the rail width of the internal rails 52 is set to be the same as the rail width of the pair of external rails 53. As a result, the change over carriage 51 is able to move freely between the internal rails 52 and the external rails 53.

The change over carriage 51 is substantially the same as that disclosed in Japanese Patent Laid-open Publication No. 2003-191063 mentioned earlier, and is configured from a base 61 having the wheels W (Wa, Wb), and transfer stands 63 including a line of support rollers 62 that support the integrated body M of the exclusive dies 3b and 5b (FIG. 12). The transfer stands 63 includes transfer means (for example, a ball screw mechanism) that uses a motor 64 as a drive power source for transferring the integrated body M on the line of support rollers 61 in the die opening-closing direction. Note that, the two stands are positioned next to each other in the movement direction of the change over carriage 51.

Moreover, the change over carriage 51 is a self-driven type, and a motor (servo motor) 65 for self drive is mounted on the base 61 thereof. A self drive mechanism of the change over carriage 51 includes a rack-and-pinion mechanism. A rack 66 is provided in an upper side wall surface of the inside of the frame 54a in which the fixed rail 52a is disposed, and a pinion 67 that meshes with the rack 66 is provided at an end of an output shaft of the motor 65 for self drive. The rack-and-pinion mechanism (the rack 66 and the pinion 67) is also provided in the frame 55 in which the external rail 53 is provided. Rotation of the servo motor 65 drives the rack-and-pinion mechanism 66 and 67, and the change over carriage 51 moves between the external rails 53 and the internal rails 52. One of the transfer stands 63 is accurately positioned at a change over position for the movable die 5 (FIG. 9).

In the present embodiment, power supply means 70 is interposed between the frame 54a in which the fixed rail 52a is provided and the change over carriage 51 in order to supply electric power to the various motors 64 and 65 in the change over carriage 51.

Figure 10:
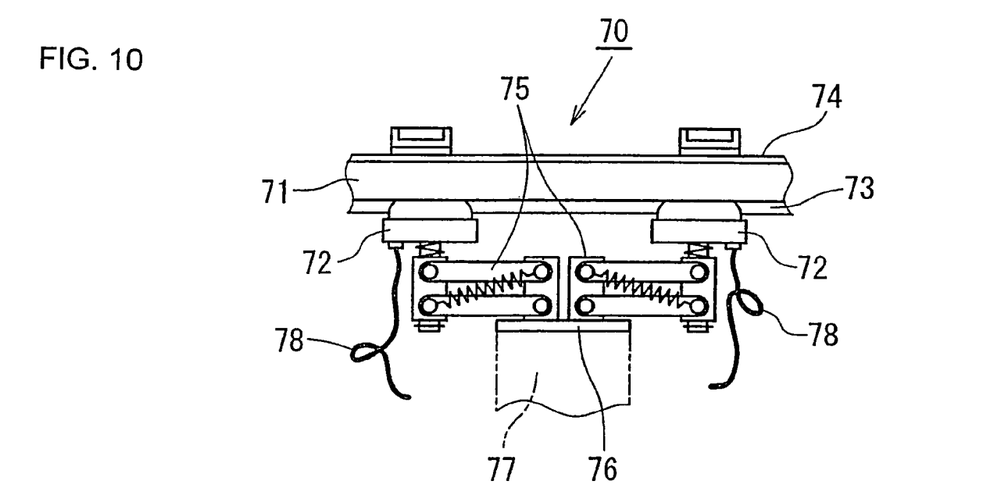
FIG. 10 is a plan view showing a partial cross section of a structure of power supply means in the present die changing apparatus.
Figure 11:
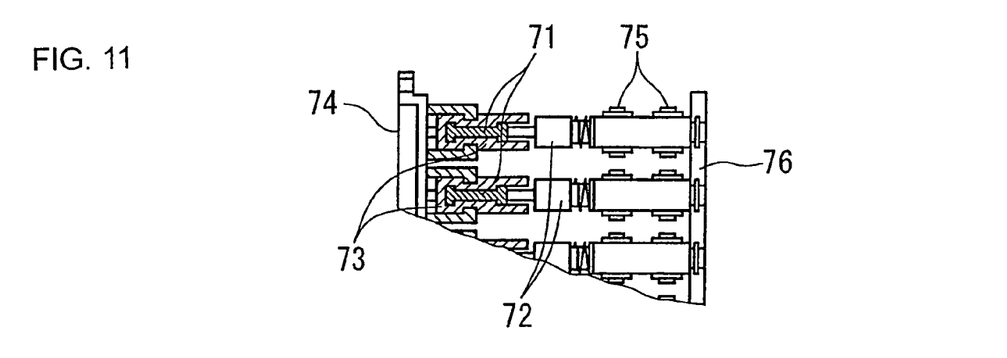
FIG. 11 is a side view showing the partial cross section of the structure of the power supply means shown in FIG. 10.

The power supply means 70, as can be seen from FIG. 10 and FIG. 11, includes transmission conductors 71 disposed at the side of the frame 54a in which the movable rail 52b is provided; and collector brushes 72 provided at the side of the change over carriage 51. The transmission conductors 71 are embedded beneath an insulator 73 and fixed via an attachment plate 74 to a recess side wall surface of the frame 54a so as to extend in the length direction thereof. On the other hand, the collector brushes 72 are fixed to a bracket 77 that extends from the change over carriage 51 via flotation mechanisms 75 including a parallelogram link and an attachment plate 76. The transmission conductors 71 and the collector brushes 72 are, in this case, provided in multiple rows in the up-down direction. Various transmission wires 78 extend from the collector brushes 72 to the various types of motors 64 and 65. With this type of power supply means 70, contact of the collector brushes 72 and the transmission conductors 71 is maintained by the floatation mechanisms 75. Accordingly, it is possible to stably supply electric power to the motors 64 and 65 within the change over carriage 51. Note that, the transmission conductors 71 of the power supply means 70 also extends within the frame 55 in which the external rails 53 are provided.

Hereinafter, the operation of the molding apparatus with the above described configuration will be described with reference to FIG. 12 and FIG. 13.

When the die casting is begun, as shown in FIG. 1, the movable plate 4 is positioned in the open die position. At this time, the split nut 28 of the second tie bar fixing means 21 at the movable plate 4 side is in a loosened position, and fixing of each tie bar 6 with respect to the movable plate 4 is released. Further, the internal rail 52 is positioned in a closed state in which the movable rail 52b is placed along with the frame 54b in proximity to the fixed rail 52a side. Then, first, the servo motor 11 within the die opening-closing means 10 rotates, and this rotation is converted to linear movement by the ball screw mechanism 12 and transmitted to the support plate 8. As a result, the support plate 8 is moved via the linear movement guide 7, and along with this, the movable plate 4 is moved forward to the fixed plate 2 side and the movable die 5 closed against the fixed die 3. Then, after die closing is completed, the cylinder 29 within the second tie bar fixing means 21 is activated, and the tightening movement of the split nut 28 within the second tie bar fixing means 21 is performed. Accordingly, as shown in FIG. 5, the split nut 28 is meshed with the plurality of grooves 26 of the tie bar 6 so that each tie bar 6 is fixed with respect to the movable plate 4.

Then, hydraulic fluid is supplied to the fluid chamber 33 on one side within the die clamping cylinder 30. Accordingly, the piston 32 in the die clamping cylinder 30 is moved till it abuts against the split nut 28 within the second tie bar fixing means 21. Then, the movable plate 4 is pushed to the fixed plate 2 side, and as a result a substantial clamping force is applied to the mating portion of the closed fixed die 3 and the movable die 5. At this time, a large moment is applied to the movable plate 4. However, since the above mentioned slight gap 8 is provided between the movable plate 4 and the support plate 8, the movable plate 4 "floats" above the support plate 8 as indicated by the long-short dash line shown in FIG. 3. Accordingly, excessive load is not applied to the linear movement guide 7, and the linear movement guide 7 is proactively prevented from suffering any damage.

Moreover, after the above described die clamping is completed, molten metal is injected into the cavity formed between the fixed die 3 and the movable die 5 from the injection unit 37, and casting is performed. When casting is completed, first, while the fluid chamber 33 on one side of the die clamping cylinder 30 is left open to the tank, hydraulic fluid is supplied to the fluid chamber 34 on the other side. Accordingly, the fixed plate 4 moves backward very slightly, and the casting within the die is released.

Next, the cylinder 29 within the second tie bar fixing means 21 is activated to perform the loosening movement of the split nut 28, whereby fixing of the respective tie bars 6 to the fixed plate 4 is released. Then, the servo motor 11 of the die opening-closing means 10 is rotated in the reverse direction to when the die was closed, whereby the movable plate 4 is moved backward from the fixed plate 2 to the open die position. Accordingly, the movable die 5 is opened with respect to the fixed die 3. Following this, the extrusion mechanism housed in the movable die 5 is activated by the cylinder unit 36, and the casting attached to the movable die 5 is removed therefrom and placed on to work carrying means, not shown. With that, one cycle of forging is completed. In this forging cycle, the frame 54 (54a and 54b) that supports the internal rails 52 is in the closed state shown in FIG. 1. Accordingly, mold releasing agent, external coolant or the like is not able to come into contact with the internal rails 52, or the rack-and-pinion mechanism 66 and 67 for driving the change over carriage 51, and the power supply means 70, and, furthermore, foreign matter cannot adhere thereto. Accordingly, the performance of these elements is stably maintained. Note that, in the forging cycle, the tie bars 6 are fixedly positioned, and thus the tie bar removal cylinders 41 that are operationally coupled to the tie bars 6 are held at the fully retracted end as shown in FIG. 1.

Next, when the exclusive dies 3b and 5b within the fixed die 3 and the movable die 5 need to be replaced, in a pre-set closed die state, both of the exclusive dies 3b and 5b are coupled together by the coupling mechanism to form the integrated body M. At the same time, the exclusive die 3b is separated from the general-use die 3a of the fixed die 3 by the above described attachment-detachment mechanism, and the integrated body M is temporarily held by the general-use die 5a of the movable plate 5. Then, the movable plate 4 is move backwards as far as the open die position by the die opening-closing means 10. As a result, the integrated body M is moved as far as the open die position along with the general-use die 5a of the movable die 5, and the general-use die 3a of the fixed die 3 is left behind on the fixed plate 2. Note that, in FIG. 9, an integrated body including the used components (old components) that need to be replaced is indicated as M1.

Next, first, the cylinder 25 is activated to perform the loosening movement of the split nut 24 in the first tie bar fixing means 20 with respect to the two lower side tie bars 6, whereby fixing of the two lower side tie bars 6 to the fixed plate 2 is released. Then, the pair of tie bar removal cylinders 41 at the lower side are activated and extended. Thus, as shown in FIG. 12, the pair of lower side tie bars 6 are removed and moved away from the fixed plate 2 as shown in FIG. 12. At this time, the respective main hollow rods 46 and the auxiliary hollow rods 48 of the tie bar removal cylinders 41 are extended in a telescopic manner. Accordingly, the two lower side tie bars 6 are retracted a long way from the fixed plate 2, and as a result a large space is opened up between the fixed plate 2 and the movable plate 4.

At the time when removal of the two lower side tie bars 6 is completed, the cylinder 59 (FIG. 8) within the die changing apparatus 50 is activated to separate the frame 54b on one side on which the movable rail 52b is provided from the frame 54a on the other side on which the fixed rail 52a is provided. The internal rails 52 are set to a determined rail width. At this time, a change over carriage 51 is waiting on the external rails 53, and one of the transfer stands 63 thereof is loaded with an integrated body M2 (FIG. 9) of new components for replacement. When the internal rails 52 are opened, the servo motor 65 for self drive in the change over carriage 51 rotates, whereby the rack-and-pinion mechanism 67 and 68 causes the change over carriage 51 to move on to the internal rails 52 form the external rails 53. Accordingly, the integrated body M2 of the new components is carried into the device.

Then, first, the empty transfer stand 63 (on the right side in FIG. 9) of the change over carriage 51 is moved to and stopped at a position at the front surface of the integrated body M1 of the old components that are temporarily fixed to the general-use die 5b of the movable die 5. Then, the attachment-detachment mechanism within the general-use die 5b of the movable die 5 is activated to push the integrated body M1 of the old components just a predetermined distance away from the recess of the general-use die 5b, and this element is loaded onto the line of support rollers 62 of the empty transfer stand 63. On the other hand, both before and after the above pushing out, the transfer means using the motor 64 as a drive power source is activated, whereby transfer of the integrated body M1 of the old components on to the transfer stand 63 is completed.

Next, the servo motor 65 for drive use is rotated in the reverse direction to when the above described carrying on was performed, and thus the change over carriage 51 is moved backwards (shifted) by just a set distance. As a result, the transfer stand 63 loaded with the integrated body M2 of the new components is positioned at the front surface of the recess of the general-use die 5a of the movable die 5. Then, the motor 64 for transfer use is rotated once again, and the integrated body M2 of the new components is pressed into the recess of the general-use die 5a by the transfer means. When this inward pressing is completed, the attachment-detachment mechanism in the general-use die 5b is activated, whereby the integrated body M2 of the new components catches on the bottom of the recess of the general-use die 5b and is fixed thereto.

Following this, the change over carriage 51 with the integrated body M1 of old components loaded thereon moves onto the external rails 53, and then the movable rail 52b of the internal rails 52 is closed once again with respect to the fixed rail 52a. Next, the tie bar removal cylinders 41 are activated and retract, and the two lower side tie bars 6 are inserted into the fixed plate 2. At the same time, the split nut 24 in the first tie bar fixing means 20 is screwed onto the screw portion 22 of the tie bar 6 by tightening movement caused by operation of the cylinder 25. Accordingly, the one end portion of each tie bar 6 is fixed to the fixed plate 2.

Next, the movable plate 4 is moved forward to the fixed plate 2 by operation of the die opening-closing means 10. As a result of this forward movement, the exclusive die 5b included in the integrated body M2 of the new components supported at the movable die 5 side is pressed into the general-use die 3a of the fixed die 3. Then, the attachment-detachment device in the general-use die 3a of the fixed die 3 is activated, and the exclusive die 3b of the general-use die 3a is fixed. At the same time, coupling of the exclusive die 3b at the fixed die 3 side and the exclusive die 3b of the movable die 5 side is released, and thus change over of the exclusive dies 3b and 5b is completed.

Note that, as shown in FIG. 13, the configuration may be such that when performing change over of the exclusive dies 3a and 5b, the two tie bars 6 on the upper side are detached from the fixed plate 2 by extension of the two tie bar removal cylinders 41 on the upper side. As a result, a large distance is opened up between the fixed plate 2 and the movable plate 4 at the upper portion side, which makes it possible, for example, to perform efficient change over of the general-use dies 3a and 5a using an overhead crane.

Figure 14:
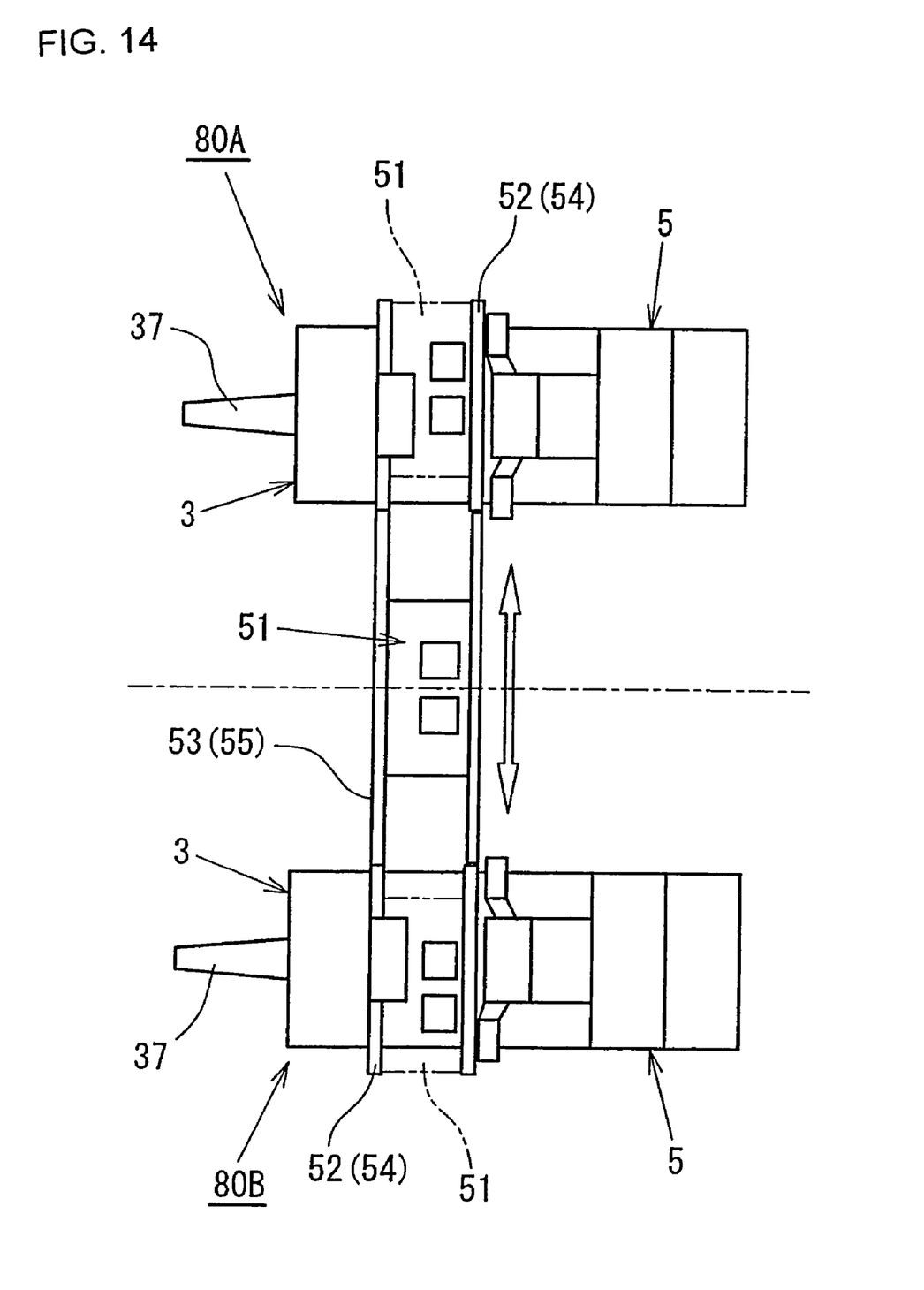
FIG. 14 is a schematic plan view showing an installation arrangement of a die changing apparatus when a pair of the present molding apparatus are used.

It should be noted that in production lines for manufacturing large sized castings like cylinder blocks, molding apparatus are often used in pairs. FIG. 14 shows an embodiment in which the molding apparatus according to the present invention with the above described configuration is provided as a pair of lined up paired machines 80A and 80B. In this case, relay rails connecting between the internal rails 52 of paired machines (molding apparatus) 80A and 80B may be utilized for the external rails 53 in the die changing apparatus 50. One change over carriage 51 may be moved along the relay rails (external rail) 53, and driven between (be shared by) the paired machines 80A and 80B. If this configuration is adopted, it is possible to efficiently change over the exclusive dies 3b and 5b in each of the paired machines 80A and 80B, and thus the paired machines 80A and 80B can be operated efficiently. Note that, in FIG. 14, for the sake of explanatory convenience, the internal rails 52 and the external rails 53 have been shown in an integrated manner with the frames 54 and 55.

Figure 15:
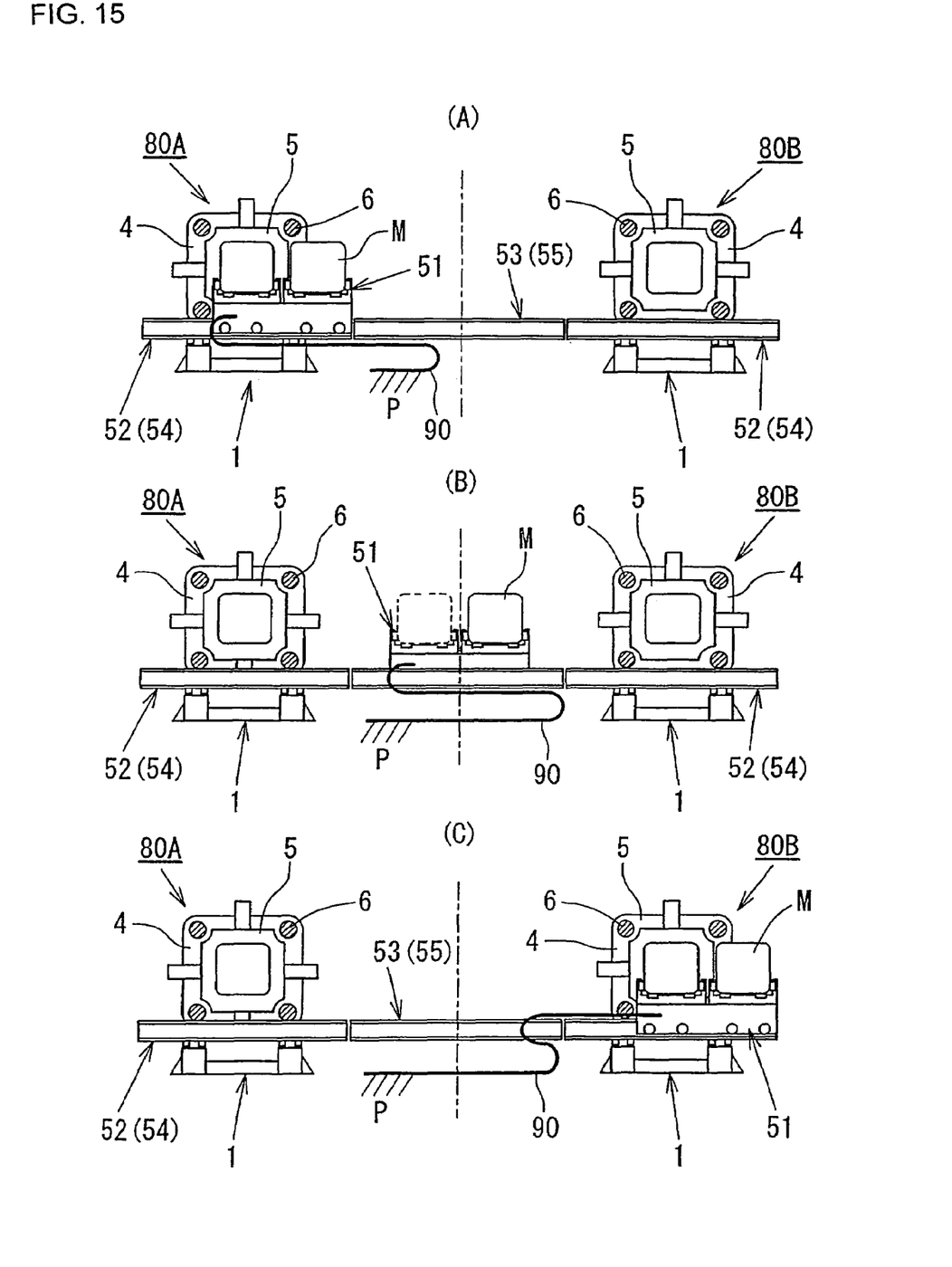
FIG. 15 is a schematic front view showing a power supply arrangement of a cable carrier for a change over carriage when the pair of the present molding apparatus are used.

Note that, in the above described embodiment, the transmission conductors 71 of the power supply means 70 are disposed in the frames 54 and 55 provided with the internal rails 52 and the external rails 53. Power is supplied to the change over carriage 51 by rubbing the brushes 72 for power supply against the transmission conductor 71. However, the form of the power supply may be selected as chosen, and, for example, the form of the power supply may be switched to one using a cable carrier 90 as shown in FIG. 15. In this case, as is apparent from the figure, the cable carrier 90 may be provided with an S-shape that winds between a fixed point P and the change over carriage 51. Accordingly, for example, the cable carrier 90 can smoothly follow movement of the change over carriage 51 as it runs between the paired machines 80A and 80B. Accordingly, it is possible to stably supply power to the change over carriage 51.

Moreover, although the die clamping cylinder 30 is provided at the movable plate 4 side in the above described embodiment, the die clamping cylinder 30 may be provided at the fixed plate 2 side. However, in the case of die casting, the injection unit 37 is disposed at the fixed plate 2 side. Accordingly, bearing in mind the possibility that oil could leak from the die clamping cylinder 30, it is preferable to position it away from the injection machine 37 on the movable plate 4 side as in the above described embodiment. Of course, with a configuration adapted for injection molding, there is no problem whatsoever even if the die clamping cylinder 30 is disposed at the fixed plate 2 side.

Moreover, in the above described embodiment, the tie bar removal cylinders 41 are positioned on the frame 40 to the rear of the movable plate 4. These tie bar removal cylinders 41 may be disposed on the movable plate 4. However, if the tie bar removal cylinders 41 are disposed on the movable plate 4 it is necessary for the tie bar removal cylinders 41 to follow along with the die opening-closing movement of the movable plate 4. Thus, in the normal forging cycle, the supply-discharge ports P1 and P2 (FIG. 6) of the tie bar removal cylinders 41 are left open to the tank.

The invention claimed is:

1. A change over method for performing change over of an exclusive die of a molding apparatus, the molding apparatus including a fixed plate supporting a fixed die; a movable plate supporting a movable die; a plurality of tie bars inserted through and extending from the fixed plate and the movable plate; die opening-closing means that moves the movable plate forward and backward with respect to the fixed plate thus opening and closing the movable die with respect to the fixed die; first tie bar fixing means that removably fixes one end portion of each of the tie bars to the fixed plate; second tie bar fixing means that removably fixes an other end of each of the tie bars to the movable plate when in a closed die position; a die clamping cylinder which is provided near to tie bar insertion holes of the fixed plate or the movable plate and which generates a clamping force that pushes the movable plate toward the fixed plate side using the first or the second tie bar fixing means and the tie bars; and a tie bar removal cylinder that moves each of the tie bars in a removal direction from the fixed plate, wherein the die opening-closing means includes a motor and a movement conversion mechanism that converts rotation of the motor to linear movement that is transmitted to a support plate on which the movable plate is mounted, the support plate being disposed on a base stand via a linear movement guide, and the die opening-closing means being disposed between the support plate and the base stand, the fixed die and the movable die each include a general-use die of the same type and the exclusive die that forms a cavity, the exclusive die being removably coupled to the general use die, and a pair of internal rails are provided which guide movement of a change over carriage for changing over the exclusive dies the pair of internal rails comprising a fixed rail and a movable rail, wherein each rail is positioned below the tie bars on a lower side and between the fixed plate and the movable plate, the pair of internal rails extending in a direction that intersects with the tie bars, on one side, the fixed rail is fixedly disposed at a front surface of the fixed plate and, on an other side, the movable rail is disposed such that it can be moved into proximity to or away from the fixed rail, the change over method comprising:

after the movable plate is moved back to an open die position by the die opening-closing means, releasing the fixing of the fixed plate side to the tie bars on the lower side while the tie bar removal cylinders are activated so as to remove the tie bars on the lower side from the fixed plate, and replacing the exclusive die by moving the change over carriage using the internal rails as a guide.

2. The change over method according to claim 1, wherein relay rails connect between the internal rails of two molding apparatus that are arranged in a row as paired machines, the method further comprises:

moving the change over carriage from the relay rails to the internal rails, the change over carriage being commonly used for the change over of the exclusive dies of both of the molding apparatus.

3. A change over method according to claim 1, further comprising:

disposing the fixed rail and the movable rail are disposed in frames with a U-shaped cross section, the two frames being configured such that when the movable rail is moved into proximity to the fixed rail, facing open ends of the frames abut with each other in a closed manner.

4. The change over method according to claim 3, wherein relay rails connect between the internal rails of two molding apparatus that are arranged in a row as paired machines, the method further comprises:

moving the change over carriage from the relay rails to the internal rails, the change over carriage being commonly used for the change over of the exclusive dies of both of the molding apparatus.

5. The change over method according to claim 3, further comprising:

disposing a transmission conductor within the frame on which the fixed rail is provided, and providing a collector brush that rubs against the transmission conductor on the change over carriage.

6. The change over method according to claim 5, wherein relay rails connect between the internal rails of two molding apparatus that are arranged in a row as paired machines, the method further comprises:

moving the change over carriage from the relay rails to the internal rails, the change over carriage being commonly used for the change over of the exclusive dies of both of the molding apparatus.

7. A change over method according to claim 3, further comprising:

disposing a rack in the frame on which the fixed rail is provided, and providing a pinion that meshes with the rack and a motor that rotates the pinion in the change over carriage.

8. The change over method according to claim 7, wherein relay rails connect between the internal rails of two molding apparatus that are arranged in a row as paired machines, the method further comprising:

moving the change over carriage from the relay rails to the internal rails, the change over carriage being commonly used for the change over of the exclusive dies of both of the molding apparatus.

\* \* \* \* \*